3,205,235
CYCLOHEPTIMIDAZOLONE COMPOUNDS
Genshun Sunagawa, Hideo Nakao, Haruhiko Minakami, Shinsaku Kobayashi, Junichi Nakazawa, Nobuo Soma, Yasunobu Sato, Mitsuo Watatani, and Yasuhiro Matsumoto, all of Tokyo, Japan, assignors to Sankyo Company, Limited, Tokyo, Japan
No Drawing. Filed Jan. 26, 1965, Ser. No. 428,232
Claims priority, application Japan, Nov. 7, 1961, 36/39,660; Dec. 29, 1961, 36/47,858; Sept. 17, 1962, 37/40,285; Oct. 10, 1962, 37/43,667
6 Claims. (Cl. 260—309.6)

This is a continuation-in-part application of our copending application Serial No. 234,249, filed October 30, 1962, now abandoned.

This invention relates to new chemical compounds. More particularly, it is concerned with new 1-substituted cycloheptimidazol-2(1H)-one compounds having the formula

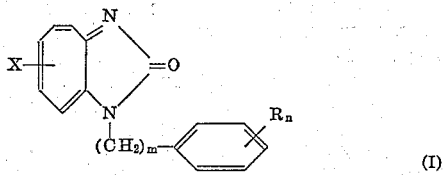

wherein X is hydrogen, straight or branched chain alkyl of from 1 to 3 carbon atoms, phenyl, nitro or chlorine; $n$ is a number from 1 to 2; when $n$ is 1, R is hydrogen, straight chain alkyl of from 1 to 3 carbon atoms, nitro, chlorine hydroxy, alkoxy of from 1 to 3 carbon atoms, alkoxy carbonyl of from 2 to 4 carbon atoms, amino or acetylamino; when $n$ is 2, R is alkoxy of from 1 to 3 carbon atoms; $m$ is a number from 1 to 2.

The 1-substituted cycloheptimidazol-2(1H)-one compounds having the above-described Formula I are novel compounds unknown in the prior art and possess potent analgesic and anti-inflammatory activities.

It is an object of the present invention to provide novel 1-substituted cycloheptimidazol-2(1H)-one compounds having the above-described Formula I useful as analgesic and anti-inflammatory agent.

Another object is the provision of a process for the preparation of said compounds. Other objects will become apparent from the following description.

According to the present invention, the 1-substituted cycloheptimidazol-2(1H)-one compounds having the above-described Formula I may be prepared by reacting cycloheptimidazolone compounds having the formula

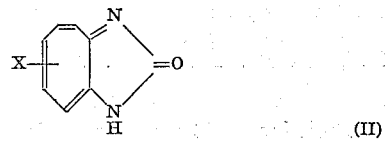

wherein X has the same meanings as set forth above or alkali metal salts thereof with compounds having the formula

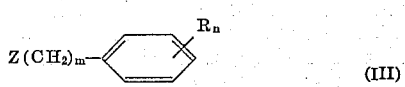

wherein R, $m$ and $n$ have the same meanings as set forth above and Z is halogen or an active ester group such as tosyloxy group.

In carrying out the process according to the present invention, the reaction is preferably carried out in water, a suitable inert organic solvent such as alcohol, dioxane, benzene or toluene, or a suitable inert aqueous organic solvent such as aqueous alcohol or aqueous dioxane. The temperature at which the reaction is conducted may be reflux temperature, but this may be raised or lowered, if desired. In cases where it is desired to use cycloheptimidazolone compounds having the above-described Formula II in the free form as reactant in the process, the cycloheptimidazolone compounds described above can be reacted with compounds having the above described Formula III in the presence of a condensing agent to produce the desired compounds having the above-described Formula I. Examples of such condensing agent which may be employed include alkali metals such as sodium, potassium and lithium, alkali metal hydrides such as sodium hydride and potassium hydride, alkali metal amides such as sodium amide and potassium amide, alkali metal-hydrocarbon compounds such as butyl lithium, phenyl lithium and phenylpotassium, alkali metal alcoholates such as sodium ethoxide and potassium butoxide, alkali metal hydroxides such as sodium hydroxide and potassium hydroxide, alkali metal carbonates such as sodium carbonate and potassium carbonate and the like. In cases where it is desired to use cycloheptimidazolone compounds having the above-described Formula II in the salt form, the above cycloheptimidazolone compounds in the salt form can be reacted with compounds having the above-described Formula III to give the desired compounds. In the latter cases, if desired, the reaction may be also effected by heating alkali metal salts of cycloheptimidazolone compounds having the Formula II above and compounds having the Formula III at a temperature of about 100° C. to about 150° C. in the absence of condensing agent and solvent.

After completion of the reaction, the reaction product may be isolated from the reaction mixture by one of the conventional methods. For example, when organic solvent such as methanol is used as the reaction solvent, the reaction mixture is concentrated, the residue is extracted with benzene or chloroform, the extract is distilled and the crude crystalline residue thus obtained is recrystallized from organic solvent such as ethanol to give the desired product. When water is used as the reaction solvent, the reaction mixture, after completion of the reaction, is directly extracted with benzene or chloroform and the extract is treated in a manner similar to that described above.

The following compounds are representative of those contemplated by the present invention and which may be perpared by the procedure discussed hereinabove.

1-benzylcycloheptimidazol-2(1H)-one;
1-(O-chlorobenzyl)cycloheptimidazol-2(1H)-one;
1-(P-nitrobenzyl)cycloheptimidazol-2(1H)-one;
1-(P-methoxybenzyl)-cycloheptimidazol-2(1H)-one;
1-(P-methylbenzyl)cycloheptimidazol-2(1H)-one;
1-(P-hydroxybenzyl)cycloheptimidazol-2(1H)-one;
1-(P-chlorobenzyl)cycloheptimidazol-2(1H)-one;
1-(m-methoxybenzyl)cycloheptimidazol-2(1H)-one;
1-(o-methoxybenzyl)cycloheptimidazol-2(1H)-one;
1-(P-carbethoxybenzyl)cycloheptimidazol-2(1H)-one;
1-(3.4-dimethoxybenzyl)cycloheptimidazol-2(1H)-one maleate;
1-(P-ethoxybenzyl)cycloheptimidazol-2(1H)-one;
1-(m-cyanobenzyl)cycloheptimidazol-2(1H)-one;
1-(P-dimethylaminobenzyl)cycloheptimidazol-2(1H)-one;
1-(P-acetylaminobenzyl)cycloheptimidazol-2(1H)-one;
1-(P-aminobenzyl)cycloheptimidazol-2(1H)-one;
1-(P-isopropylbenzyl)cycloheptimidazol-2(1H)-one;
1-(P-ethylbenzyl)cycloheptimidazol-2(1H)-one;
1-phenethylcycloheptimidazol-2(1H)-one;
1-(P-methoxyphenethyl)cycloheptimidazol-2(1H)-one;
1-(P-chlorophenethyl)cycloheptimidazol-2(1H)-one;
1-(P-nitrophenethyl)cycloheptimidazol-2(1H)-one;

1-[γ-(o-methoxyphenyl)-propyl]cycloheptimidazol-2(1H)-one;
1-[γ-(p-nitrophenyl)-propyl]cycloheptimidazol-2(1H)-one;
1-(P-methylphenethyl)cycloheptimidazol-2(1H)-one;
1-benzyl-5-isopropyl cycloheptimidazol-2(1H)-one;
1-(O-methoxyzenzyl)-5-isopropyl cycloheptimidazol-2(1H)-one;
1-(P-nitrobenzyl)-5-isopropyl cycloheptimidazol-2(1H)-one;
1-benzyl-7-isopropyl cycloheptimidazol-2(1H)-one;
1-benzyl-4-methyl cycloheptimidazol-2(1H)-one;
1-(P-methoxylbenzyl)-4-methyl cycloheptimidazol-2(1H)-one;
1-benzyl-4-phenyl cycloheptimidazol-2(1H)-one;
1-(P-methylbenzyl)-4-phenyl cycloheptimidazol-2(1H)-one;
1-benzyl-6-methoxy cycloheptimidazol-2(1H)-one;
1-(O-methoxybenzyl)-6-methoxy cycloheptimidazol-2(1H)-one;
1-benzyl-6-dimethylamino cycloheptimidazol-2(1H)-one;
1-benzyl-5-acetyl cycloheptimidazol-2(1H)-one;
1-benzyl-4-carbethoxy cycloheptimidazol-2(1H)-one;
1-benzyl-6-nitro-cycloheptimidazol-2(1H)-one;
1-(P-nitrobenzyl)-6-nitro cycloheptimidazol-2(1H)-one;
1-benzyl-6-chloro cycloheptimidazol-2(1H)-one;
1-(P-methylbenzyl)-6-chloro cycloheptimidazol-2(1H)-one;
1-benzyl-4-bromo-7-isopropyl cycloheptimidazol-2(1H)-one.

The following examples are given for the purpose of illustrating the present invention, but are not intended to be limiting on the scope thereof.

*Example 1*

To a suspension of 1 g. of cycloheptimidazol-2(1H)-one in 5 ml. of methanol is added with stirring a solution of 280 mg. of sodium hydroxide dissolved in 1 ml. of water. After the addition, the crystalline material precipitated is collected by filtration, washed with methanol and dried to give 0.8 g. of the sodium salt. 8 ml. of methanol and 0.6 g. of benzyl chloride are added to 0.8 g. of the sodium salt and the mixture is heated under reflux on a water bath for 5 hours. The reaction mixture is distilled to remove the solvent and the residue is shaken with 10 ml. of chloroform and 5 ml. of water. The aqueous layer separated is extracted with chloroform, and the chloroform extract is combined with first chloroform solution. The combined chloroform solution is washed with 5 ml. of water and the chloroform is distilled off from the solution.

The reisdue (1 g.) thus obtained is recrystallized from 40 ml. of benzene to give 1-benzyl cycloheptimidazol-2-(1H)-one melting at 179 to 181° C.

*Analysis.*—Calculated for $C_{15}H_{12}ON_2$: C, 76.25; H, 5.12; N, 11.86. Found: C, 76.14; H, 4.96; N, 11.98.

U.V. $\lambda_{max.}^{EtOH}$ 254 m$\mu$ (log $\epsilon$ 4.47), 343 m$\mu$ (log $\epsilon$ 3.97), and 374 m$\mu$ (log $\epsilon$ 3.84).

The hydrochloride has melting point of 232° C. with decomposition and the following analytical data.

Calculated for $C_{15}H_{13}ON_2Cl$: C, 66.05; H, 4.80; N, 10.27. Found: C, 65.81; H, 4.79; N, 9.98.

*Example 2*

To a solution of 160 mg. of metallic sodium in 10 ml. of methanol is added 1 g. of cycloheptimidazol-2(1H)-one. After complete dissolution of the cycloheptimidazol-2(1H)-one, 0.9 g. of benzyl chloride is added to the solution and the mixture is heated under reflux on a water bath for 5 hours. The reaction mixture is treated in a manner similar to that used in Example 1 to give 0.8 g. of 1-benzylcycloheptimidazol-2(1H)-one.

*Analysis.*—Calculated for $C_{15}H_{12}ON_2$: C, 76.25; H, 5.12; N, 11.86. Found: C, 76.20; H, 5.08; N, 11.74.

*Example 3*

The procedure in Example 1 is followed except that 0.5 g. of sodium salt of cycloheptimidazol-2(1H)-one is heated under reflux with 0.5 g. of O-chlorobenzyl chloride in 6 ml. of methanol for 5 hours. 0.4 g. of 1-(O-chlorobenzyl)cycloheptimidazol-2(1H)-one melting at 220 to 223° C. is obtained.

*Analysis.*—Calculated for $C_{15}H_{11}ON_2Cl$: C, 66.54; H, 4.10; N, 10.35. Found: C, 66.35; H, 4.02; N, 10.41.

*Example 4*

0.5 g. of sodium salt of cycloheptimidazol-2(1H)-one prepared by the process described in Example 1 and 0.6 g. of P-nitrobenzyl bromide are heated under reflux in 8 ml. of methanol. After refluxing for about 1 hour, the crystalline material which precipitates is filtered, washed with water and recrystallized from ethanol to give 0.6 g. of 1-(P-nitrobenzyl)cycloheptimidazol-2(1H)-one melting at 260° C. with decomposition.

*Analysis.*—Calculated for $C_{15}H_{11}O_3N_3$: C, 64.05; H, 3.94; N, 14.94. Found: C, 64.47; H, 4.06; N, 14.73.

*Example 5*

The procedure in Example 1 is followed except that 0.5 g. of sodium salt of cycloheptimidazol-2(1H)-one and 0.5 g. of P-methoxybenzyl chloride are heated under reflux in 6 ml. of methanol for 15 hours.

There is obtained 0.1 g. of 1-(P-methoxybenzyl)cycloheptimidazol-2(1H)-one melting at 191 to 193° C.

*Analysis.*—Calculated for $C_{16}H_{14}O_2N_2$: C, 72.16; H, 5.30; N, 10.52. Found: C, 72.37; H, 5.56; N, 10.35.

*Example 6*

0.5 g. of sodium salt of 5-isopropylcycloheptimidazol-2(1H)-one obtained according to the procedure in Example 1 and 0.6 g. of benzyl tosylate are heated under reflux in 5 ml. of benzene for 5 hours. After completion of the reaction, the reaction mixture is treated in a manner similar to that used in Example 1 to give 0.2 g. of 1-benzyl-5-isopropylcycloheptimidazol-2(1H)-one melting at 158 to 160° C.

*Analysis.*—Calculated for $C_{18}H_8ON_2$: C, 77.67; H, 6.52; N, 10.07. Found: C, 77.37; H, 6.67; N, 9.98.

*Example 7*

To a solution of 76 mg. of metallic sodium dissolved in 20 ml. of ethanol is added 573 mg. of 6-nitrocycloheptimidazol-2(1H)-one and the mixture is stirred for 10 minutes. 565 mg. of benzyl bromide is added to the mixture and the resulting mixture is then heated under reflux for 5 hours. After cooling, the reaction mixture is filtered, the crude crystalline material separated is washed with water and recrystallized from methanol. There is obtained 350 mg. of 1-benzyl-6-nitrocycloheptimidazol-2(1H)-one as yellow scales melting at 258 to 259° C.

*Analysis.*—Calculated for $C_{15}H_{11}O_3N_3$: C, 64.05; H, 3.96; N, 14.94. Found: C, 63.92; H, 4.06; N, 14.65.

*Example 8*

A solution of 40 mg. of metallic sodium dissolved in 10 ml. of absolute ethanol is added to a solution of 315 mg. of 6-chloro-cycloheptimidazol-2(1H)-one in 10 ml. of hot absolute ethanol and the mixture is stirred for 10 minutes. A solution of 295 mg. of benzyl bromide in 5 ml. of absolute ethanol is added to the mixture and the mixture thus obtained is stirred under reflux for 9.5 hours. After completion of the reaction, the reaction mixture is allowed to stand overnight and the crystalline material which precipitates is recrystallized from methanol. There is obtained 250 mg. of 1-benzyl-6-chlorocycloheptimidazol-2(1H)-one as pale yellow needles melting at 218 to 219° C.

*Analysis.*—Calculated for $C_{15}H_{11}ON_2Cl \cdot \frac{1}{2}H_2O$: C, 64.40; H, 4.32; N, 10.01. Found: C, 64.34; H, 4.35; N, 9.87.

Example 9

A mixture of 1.68 g. of sodium salt of cycloheptimidazol-2(1H)-one and 1.6 g. of P-methylbenzyl chloride in 30 ml. of ethanol is heated under reflux for 4 hours. Crystalline material which precipitates is filtered while hot, the filtrate is concentrated and the resulting crystalline material is washed with water and recrystallized from ethanol to give 1.0 g. of 1-(P-methylbenzyl)cycloheptimidazol-2(1H)-one melting at 198° C.

Analysis.—Calculated for $C_{16}H_{14}ON_2$: C, 76.78; H, 5.64; N, 11.19. Found: C, 76.51; H, 5.41; N, 11.09.

Example 10

A mixture of 3.3 g. of sodium salt of cycloheptimidazol-2(1H)-one and 3.3 g. of O-methoxybenzyl chloride in 60 ml. of ethanol is stirred under reflux for 4.5 hours. The crystalline material which precipitates is filtered off, the filtrate is concentrated, water is added to the concentrate and the mixture is extracted with chloroform. The chloroform solution is dried over sodium sulfate, passed through an alumina column and the chloroform distilled off from the effuluent. The crystalline material thus obtained is recrystallized from ethanol to give 2.8 g. of 1-(O-methoxybenzyl)cycloheptimidazol-2(1H)-one melting at 169° C.

Analysis.—Calculated for $C_{16}H_{14}O_2N_2$: C, 72.16; H, 5.30; N, 10.52. Found: C, 71.95; H, 5.19; N, 10.41.

Example 11

To a suspension of 3.4 g. of sodium salt of cycloheptimidazol-2(1H)-one in 35 ml. of ethanol is added with stirring 1.7 g. of P-carbethoxybenzyl bromide and the mixture is heated under reflux for 6 hours. After completion of the reaction, the insoluble inorganic substance is filtered off, the filtrate is concentrated and the residue is cooled. The crude crystalline material thus formed is recrystallized from methanol to give 3.6 g. of 1-(P-carbethoxybenzyl)-cycloheptimidazol-2(1H)-one as pale yellow needles melting at 180° C.

Analysis.—Calculated for $C_{18}H_{16}N_2O_3$: C, 70.11; H, 5.23; N, 9.09. Found: C, 70.05; H, 5.27; N, 8.91.

Example 12

To a suspension of 3.0 g. of sodium salt of cycloheptimidazol-2(1H)-one in 30 ml. of ethanol is added with stirring 3.5 g. of 3.4-dimethoxybenzyl chloride and the mixture is heated under reflux for 4.5 hours. After cooling, the insoluble inorganic substance is filtered off and the filtrate is concentrated under reduced pressure. The oily residue is dissolved in benzene and the solution is extracted with diluted hydrochloric acid. The hydrochloric acid layer is made alkaline with aqueous sodium hydroxide solution and the oily substance separated is extracted with chloroform. The chloroform layer is dried over soduim sulfate and the chloroform is distilled off. Alcoholic maleic acid solution is added to the oily residue, the mixture is made into a solution by heating and then cooled. The crystalline material which precipitates is recovered by filtration and recrystallized from ethanol to given 1.8 g. of 1-(3.4-dimethoxybenzyl)-cycloheptimidazol-2(1H)-one maleate melting at 154 to 155° C.

Analysis.—Calculated for $C_{21}H_{20}O_7N_2$: C, 61.16; H, 4.89; N, 6.79. Found: C, 61.02; H, 4.92; N, 6.84.

Example 13

To a solution of 180 mg. of metallic sodium in 20 ml. of ethanol is added with stirring 1.25 g. of 4-methylcycloheptimidazol-2(1H)-one and the mixture is made into a solution by the addition of 50 ml. of water. The solution is evaporated to dryness under reduced pressure, the residue comprising the soduim salt is pulverized in a mortar and suspended in 20 ml. of ethanol. 1.04 g. of benzyl chloride is added to the suspension and the mixture is heated under reflux with stirring for 4 hours. After completion of the reaction, the ethanol is distilled off under reduced pressure, the residue is dissolved in chloroform, the chloroform solution is washed with water and the chloroform is distilled off. Benzene is then added to the residue and the crystalline material thus obtained is recrystallized from benzene to give 0.9 g. of 1-benzyl-4-methylcycloheptimidazol-2(1H)-one as pale yellow prisms melting at 186 to 187° C.

Analysis.—Calculated for $C_{16}H_{14}ON_2$: C, 76.78; H, 5.64; N, 11.19. Found: C, 76.87; H, 5.54; N, 11.04.

Example 14

To a solution of 115 mg. of metallic sodium in 20 ml. of ethanol is added with stirring 1.11 g. of 4-phenylcycloheptimidazol-2(1H)-one and the mixture is made into a solution by the addition of 50 ml. of water. The solution is evaporated to dryness under reduced pressure, the residue is pulverized in a mortar and suspended in 50 ml. of ethanol. 664 mg. of benzyl chloride is added to the suspension and the mixture is heated under reflux with stirring for 4 hours. After completion of the reaction, the reaction mixture is concentrated under reduced pressure, chloroform and water are added to the residue and the mixture is shaken. The chloroform layer is separated, washed with water and concentrated. Benzene is added to the residue. The crystalline material thus obtained is recrystallized from ethanol to give 0.8 g. of 1-benzyl-4-phenylcycloheptimidazol-2(1H)-one as yellowish brown prisms melting at 225–226° C.

Analysis.—Calculated for $C_{12}H_{16}ON_2$: C, 80.75; H, 5.16; N, 8.97. Found: C, 81.00; H, 5.35; N, 8.75.

Example 15

To a suspension of 3.6 g. of cycloheptimidazol-2(1H)-one in 15 ml. of methanol is added a solution of 1 g. of soduim hydroxide dissolved in 3 ml. of water. After dissolution of the cycloheptimidazol-2(1H)-one, the corresponding sodium salt is precipitated as yellow crystalline material. The crystalline material is recovered by filtration, washed with a small amount of ethanol and dried. The mother liquor is concentrated, the crystalline material is collected by filtration, washed with a small amount of ethanol and dried. A total of 3.8 g. of the soduim salt of cycloheptimidazol-2(1H)-one is obtained. 15 ml. of benzyl chloride is added to sodium salt of cycloheptimidazol-2(1H)-one prepared as described above and the mixture is heated on an oil bath at a temperature of 130 to 150° C. for 30 minutes. 50 ml. of chloroform is added to the reaction mixture, the mixture is extracted with 10% aqueous hydrochloric acid and the acidic aqueous extract is made alkaline by the addition of aqueous sodium hydroxide solution. Pale yellow crystalline material thus formed is collected by filtration, washed with water, dried and then recrystallized from benzene to give 2.1 g. of 1-benzylcycloheptimidazol-2(1H)-one melting at 179 to 181° C.

Example 16

To a solution of 3.6 g. of cycloheptimidazol-2(1H)-one dissolved in 20 ml. of 5% aqueous sodium hydroxide solution is added 3.2 g. of benzyl chloride and the mixture is heated on a water bath at 60 to 80° C. with stirring for 3 hours to obtain dark brown mass. The mass is extracted twice with 10 ml. portions of chloroform and the combined extract is treated in a manner similar to that described in Example 1 to give 3.1 g. of 1-benzylcycloheptimidazol-2(1H)-one melting at 179 to 181° C.

Example 17

2.9 g. of cycloheptimidazol-2(1H)-one is dissolved in a solution of 0.8 g. of sodium hydroxide dissolved in a mixture of 15 ml. of water and 15 ml. of ethanol, 2.7 g. of O-chlorobenzyl chloride is added to the solution and the mixture is heated under reflux with stirring for 8 hours. After completion of the reaction, the reaction mixture is treated in a manner similar to that described in Example 1 to give 3.5 g. of 1-(O-chlorobenzyl)cycloheptimidazo-2(1H)-one melting at 220 to 223° C.

*Analysis.*—Calculated for $C_{15}H_{11}ON_2Cl$: C, 66.54; H, 4.10; N, 10.35. Found: C, 66.35; H, 4.02; N, 10.41.

*Example 18*

3.6 g. of cycloheptimidazol-2(1H)-one is dissolved in a solution of 1.4 g. of potassium hydroxide dissolved in a mixture of 15 ml. of water and 15 ml. of ethanol, 5.4 g. of P-nitrobenzyl bromide is added to the solution and the mixture is heated under reflux for 1 hour. After completion of the reaction, the solvent is removed from the reaction mixture by distillation. The crystalline material is collected by filtration, washed with water and recrystallized from ethanol to give 5 g. of 1-(P-nitrobenzyl)cycloheptimidazol-2(1H)-one melting at 260° C. with decomposition.

*Analysis.*—Calculated for $C_{15}H_{11}O_3N_3$: C, 64.05; H, 3.94; N, 14.94. Found: C, 64.35; H, 3.83; N, 15.34.

*Example 19*

To a solution of 3.6 g. of cycloheptimidazol-2(1H)-one in 15 ml. of 7% aqueous sodium hydroxide solution is added 15 ml. of dioxane and 3.9 g. of P-methoxybenzyl chloride and the mixture is heated under reflux with stirring for 10 hours. After completion of the reaction, the solvent is distilled off to give 4 g. of 1-(P-methoxybenzyl)cycloheptimidazol-2(1H)-one melting at 191 to 193° C.

*Analysis.*—Calculated for $C_{16}H_{14}O_2N_2$: C, 72.16; H, 5.30; N, 10.52. Found: C, 72.14; H, 5.27; N, 10.35.

*Example 20*

To a solution of 1.9 g. of 5-isopropylcycloheptimidazol-2(1H)-one dissolved in a mixture of 8 ml. of 5% aqueous sodium hydroxide solution and 10 ml. of ethanol is added 2.5 g. of benzyl tosylate and the mixture is heated under reflux for 6 hours. After completion of the reaction, the reaction mixture is treated in a manner similar to that used in Example 1 to give 1.5 g. of 1-benzyl-5-isopropylcycloheptimidazol-2(1H)-one melting at 158 to 160° C.

*Analysis.*—Calculated for $C_{18}H_{18}ON_2$: C, 77.67; H, 6.52; N, 10.07. Found: C, 77.63; H, 6.54; N, 10.18.

*Example 21*

To a suspension of 573 mg. of 6-nitrocycloheptimidazol-2(1H)-one in 20 ml. of 80% aqueous ethanol solution is added a solution of 132 mg. of sodium hydroxide in 0.5 ml. of water and the mixture is stirred for 10 minutes. 565 mg. of benzyl bromide is added to the mixture and the mixture is heated under reflux with stirring for 5 hours. After cooling, the reaction mixture is filtered and the crystalline material thus obtained is recrystallized from methanol to give 350 mg. of 6-nitro-1-benzyl-cycloheptimidazol-2(1H)-one as yellow crystalline substance melting at 258 to 259° C. with decomposition.

*Analysis.*—Calculated for $C_{15}H_{11}O_3N_3$: C, 64.05; H, 3.96; N, 14.94. Found: C, 63.92; H, 4.06; N, 14.65.

*Example 22*

315 mg. of 6-chlorocycloheptimidazol-2(1H)-one is dissolved in 10 ml. of 80% aqueous ethanol, the solution is added to a solution of 90 mg. of sodium hydroxide in 10 ml. of aqueous ethanol and the mixture is stirred for 10 minutes. To the resulting mixture is added a solution of 295 mg. of benzyl chloride in 5 ml. of 80% aqueous ethanol and the mixture is heated under reflux with stirring for 10 hours. Crystalline material thus obtained is recrystallized from methanol to give 300 mg. of 1-benzyl-6-chlorocycloheptimidazol-2(1H)-one as pale yellow needles melting at 218 to 219° C.

*Analysis.*—Calculated for $C_{15}H_{11}ON_2Cl \cdot \frac{1}{2}H_2O$: C, 64.40; H, 4.32; N, 10.01. Found: C, 64.34; H, 4.35; N, 9.87.

*Example 23*

To a solution of 0.4 g. of sodium hydroxide in a mixture of 15 ml. of water and 15 ml. of ethanol are added 1.4 g. of cycloheptimidazol-2(1H)-one and 1.5 g. of P-methylbenzyl chloride and the mixture is heated under reflux with stirring for 4 hours. After completion of the reaction, the solvent is distilled off and the crystalline residue is recrystallized from ethanol to give 0.8 g. of 1-(P-methylbenzyl)cycloheptimidazol-2(1H)-one melting at 198° C.

*Example 24*

To a solution of 0.4 g. of sodium hydroxide in a mixture of 15 ml. of water and 15 ml. of ethanol are added 1.4 g. of cycloheptimidazol-2(1H)-one and 1.6 g. of O-methoxybenzyl chloride and the mixture is heated under reflux with stirring for 4 hours. After completion of the reaction, the reaction mixture is treated in the same manner as described in Example 1 except that the crystallization is carried out with use of ethanol. There is obtained 1.1 g. of 1-(O-methoxybenzyl)cycloheptimidazol-2(1H)-one melting at 169° C.

*Analysis.*—Calculated for $C_{16}H_{14}N_2O_2$: C, 72.16; H, 5.30; N, 10.52. Found: C, 71.95; H, 5.19; N, 10.44.

*Example 25*

To a solution of 2.9 g. of cycloheptimidazol-2(1H)-one in 18 ml. of 5% aqueous sodium hydroxide solution are added 4 g. of 3.4-dimethoxybenzyl chloride and 30 ml. of ethanol and the mixture is heated under reflux for 4 hours. After completion of the reaction, the ethanol is distilled off, benzene is added to the residue and the mixture is extracted with 10% aqueous hydrochloric acid solution. The hydrochloric acid layer is made alkaline and the oily substance which separates is extracted with chloroform. The chloroform extract is dried over sodium sulfate and the chloroform is distilled off. Oily residue weighing 1.5 g. is added to a solution of 0.8 g. of maleic acid in 8 ml. of ethanol, the mixture is made into a solution by heating and cooled. The crystalline material thus obtained is recrystallized from ethanol to give 1.5 g. of 1-(3.4-dimethoxybenzyl)cycloheptimidazol-2(1H)-one maleate as pale yellow prisms melting at 154 to 155° C.

*Analysis.*—Calculated for $C_{21}H_{20}O_7N_2$: C, 61.16; H, 4.89; N, 6.79. Found: C, 61.07; H, 4.86; N, 6.76.

*Example 26*

To a solution of 115 mg. of metallic sodium in 10 ml. of methanol are added 730 mg. of cycloheptimidazol-2(1H)-one and 930 mg. of phenethyl bromide and the mixture is heated under reflux for 6 hours. After completion of the reaction, the reaction mixture is concentrated under reduced pressure, water is added to the residue and the mixture is extracted with chloroform. The chloroform is distilled off from the extract and the residue is crystallized from benzene to give 850 mg. of 1 - phenethylcycloheptimidazol - 2(1H) - one melting at 173° C.

*Analysis.*—Calculated for $C_{16}H_{14}ON_2$: C, 76.78; H, 5.64; N, 11.19. Found: C, 76.95; H, 5.79; N, 11.21.

*Example 27*

To a suspension of 1.68 g. of sodium salt of cycloheptimidazol-2(1H)-one in 20 ml. of ethanol is added 2.0 g. of P-acetylaminobenzyl chloride and the mixture is heated under reflux with stirring for 3 hours. After completion of the reaction, the reaction mixture is cooled, the insoluble inorganic substance is filtered off and the filtrate is evaporated to dryness. The crystalline material thus obtained is recrystallized from methanol to give 1.8 g. of 1-(P-acetylaminobenzyl)cycloheptimidazol-2(1H)-one melting at 260° C.

*Analysis.*—Calculated for $C_{17}H_{15}N_3O_2$: C, 69.61; H, 5.15; N, 14.33. Found: C, 69.59; H, 5.11; N, 14.34.

What is claimed is:
1. A compound having the formula

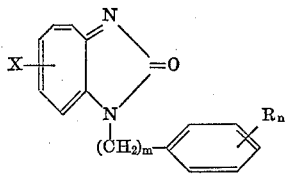

wherein X is a member selected from the group consisting of hydrogen, straight chain alkyl of from 1 to 3 carbon atoms, branched chain alkyl of from 1 to 3 carbon atoms, phenyl, nitro and chlorine, $n$ is from 1 to 2, and when $n$ is 1, R is a member selected from the group consisting of hydrogen, straight chain alkyl from 1 to 3 carbon atoms, nitro, chlorine, hydroxy, alkoxy of from 1 to 3 carbon atoms, alkoxycarbonyl of from 2 to 4 carbon atoms, amino and acetylamino, and when $n$ is 2, R is alkoxy of from 1 to 3 carbon atoms, and $m$ is from 1 to 2.

2. 1-benzyl cycloheptimidazol-2(1H)-one.
3. 1-phenethyl cycloheptimidazol-2(1H)-one.
4. 1-(p-methoxybenzyl) cycloheptimidazol-2(1H)-one.
5. 1-(p-methylbenzyl) cycloheptimidazol-2(1H)-one.
6. 1-benzyl-5-isopropyl cycloheptimidazol-2(1H)-one.

No references cited.

WALTER A. MODANCE, *Primary Examiner.*